March 9, 1937.  D. COLLINS  2,073,444
ELECTRIC STARTING MOTOR
Filed Sept. 21, 1934  3 Sheets-Sheet 2

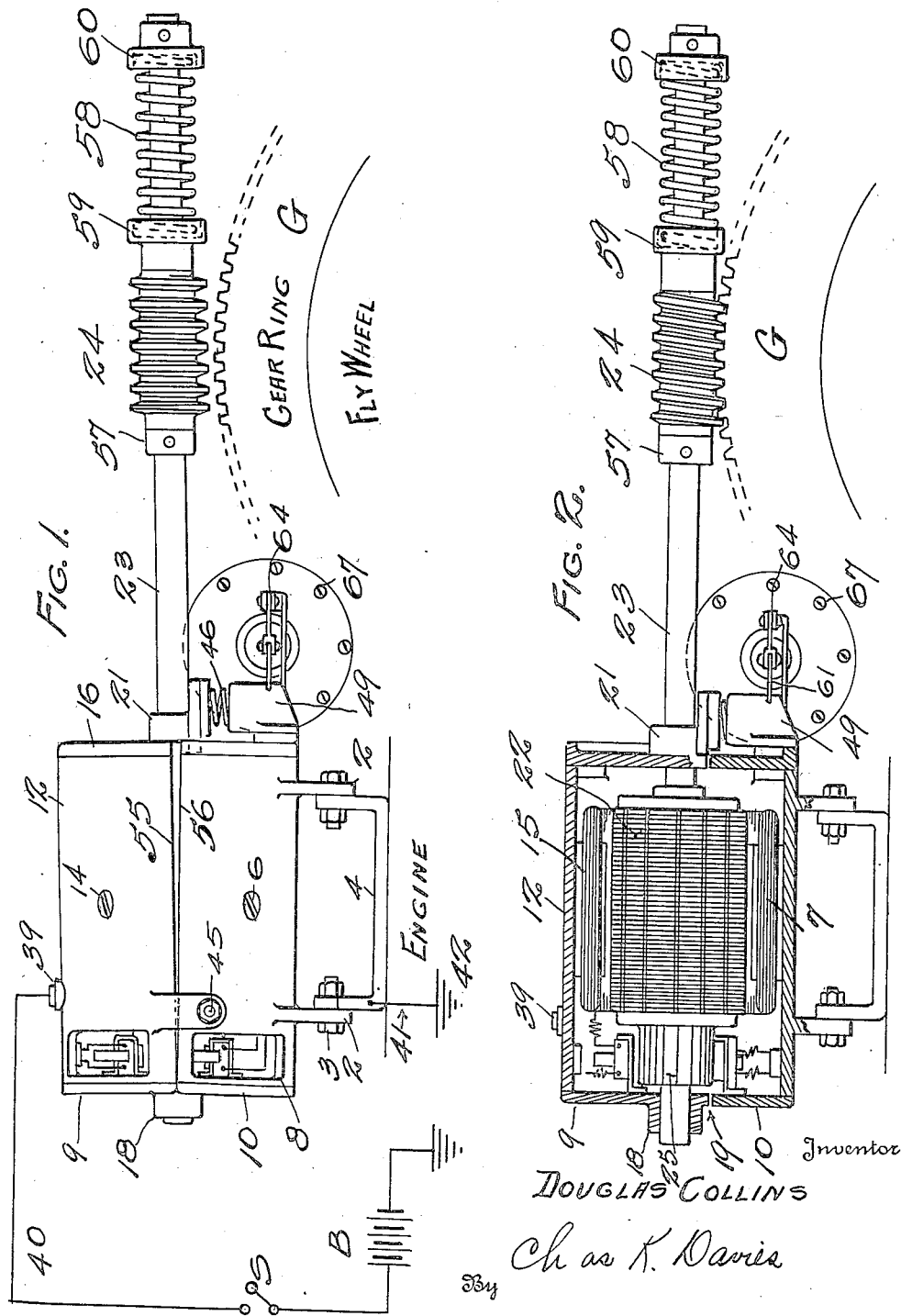

Inventor
DOUGLAS COLLINS
By Chas K. Davis
Attorney

March 9, 1937.  D. COLLINS  2,073,444
ELECTRIC STARTING MOTOR
Filed Sept. 21, 1934   3 Sheets-Sheet 3
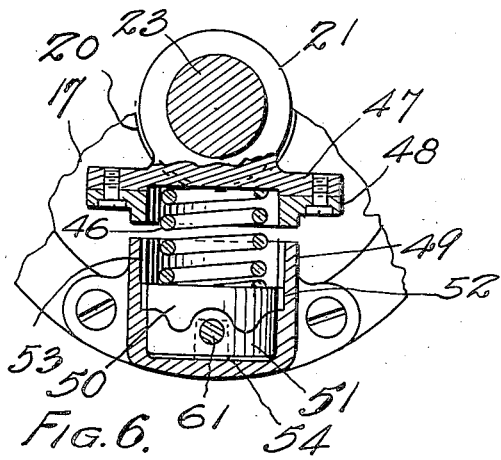
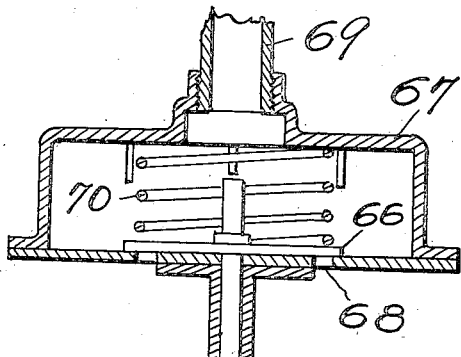
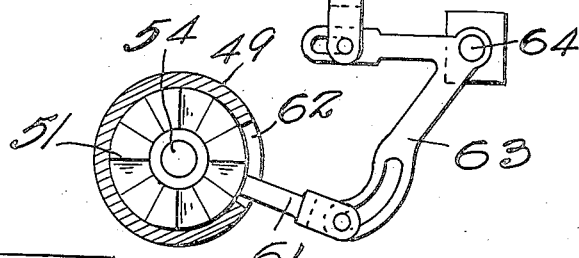
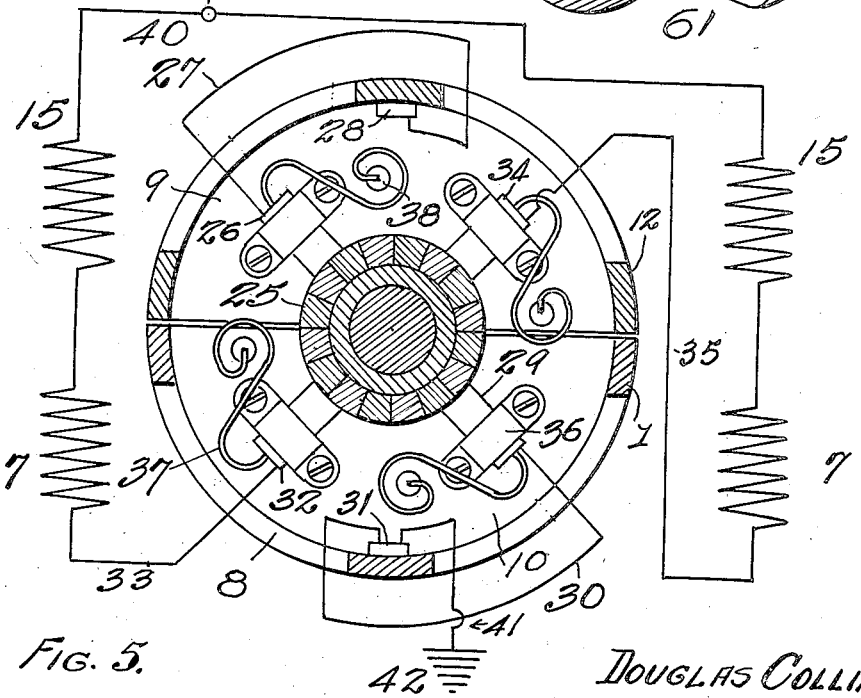
Inventor
DOUGLAS COLLINS
By Chas. K. Davies
Attorney Patented Mar. 9, 1937

2,073,444

UNITED STATES PATENT OFFICE 2,073,444

ELECTRIC STARTING MOTOR

Douglas Collins, Salisbury, N. C.

Application September 21, 1934, Serial No. 744,930

10 Claims. (Cl. 290—38)

My present invention relates to improvements in electric starting motors of the worm-gear type, designed especially for use with the gear-ring of a flywheel in starting or cranking internal combustion engines. This application relates, broadly, to the same subject matter of invention as contained in co-pending application Ser. No. 714,148.

In carrying out my invention I employ a longitudinally split electric motor, on the armature shaft of which is mounted a slidable driving member or worm-gear, keyed to revolve with the shaft, and the shaft and worm are oscillated or reciprocated in the same plane as the gear ring for engagement with and disengagement of the worm from the gear ring. The worm or driving member is electrically controlled for self-engagement with the driven member; automatically operating means are employed for disengaging the driving member from the driven member; and in combination with the latter means I employ engine-operated means, as suction from the cylinders of the internal combustion engine, for augmenting the power of the releasing or disengaging devices.

By the utilization of the combinations and arrangements of parts of my invention in a starting motor of this type employing a worm gear and gear-ring of the flywheel for transmission of power, a silent or noiseless action is accomplished in the engagement and disengagement of parts, the liability of breaking teeth or stripping the gears is eliminated, and a smooth-operating power transmitting means is secured. Efficiency and economy in the operation of the starting motor are also accomplished with a lower expenditure of electrical energy because of the arrangement and combinations of parts, as will hereinafter be more fully set forth.

I contemplate the use of my electric starting motor as a unit in a system of control for automotive vehicles, aircraft, watercraft, and in other relations, where the motor circuit is closed and my starting motor is energized by the use of suitable operating means. In such systems, automatically operating means are employed, after the engine is started, for breaking the motor circuit and thus de-energizing the starting circuit, after which the motor is automatically operated to disengage the power transmitting means. In carrying out my present invention I employ engine-operated means, when the engine is running, for augmenting the disengaging means in the performance of its functions, and also for overcoming the electrical energy required for operating the motor, thereby preventing accidental or undesired engagement of the transmission gears.

It will be understood that the starting motor, when energized, first operates as an electromagnet to cause the engagement of the worm-gear with the gear ring of the flywheel, by swinging the motor shaft and worm gear in the same plane with the gear-ring to mesh these parts. This self-engagement of the motor with the gear ring of the flywheel is accomplished by a low-power development created in the motor imposed against a low degree of resistance from the disengaging device, and then the maximum force of the electric motor operating in usual manner, is exerted in usual manner to transmit power through the worm-gear to the gear-ring to revolve the flywheel and start the engine. When the motor is de-energized the gears are automatically disengaged by a compressed spring, and the tension of this spring is increased, sufficiently, when the engine is running, to overcome the electrical energy of the motor, thereby disconnecting the starter and holding the starter disconnected, even though the starting circuit may be closed.

In the accompanying drawings I have illustrated one complete example of the physical embodiment of my invention wherein the parts are combined and arranged according to one mode I have thus far devised for the practical application of the principles of my invention. It will be understood that changes and alterations may be made in the exemplified structure, within the scope of my claims, without departing from the principles of my invention. It is intended that all of the matter contained in the following description, or shown in the accompanying drawings, shall be interpreted as illustrative, and not in a limiting sense, and the language of the claims is intended to cover all generic and specific features of the invention.

Figure 1 is a view showing an embodiment of my invention with the worm-gear and gear-ring disengaged, and Figure 2 is a longitudinal sectional view, with parts in full, showing the worm-gear and gear-ring engaged for starting the engine.

Figure 5 is a diagrammatic view, showing the motor and commutator in section, with the brushes in full lines.

Figure 6 is a detail sectional view showing the disengaging spring and connections.

Figure 7 is a sectional detail view showing one arrangement of the engine-operated means for augmenting the tension of the disengaging spring of Figure 6.

Figure 3:
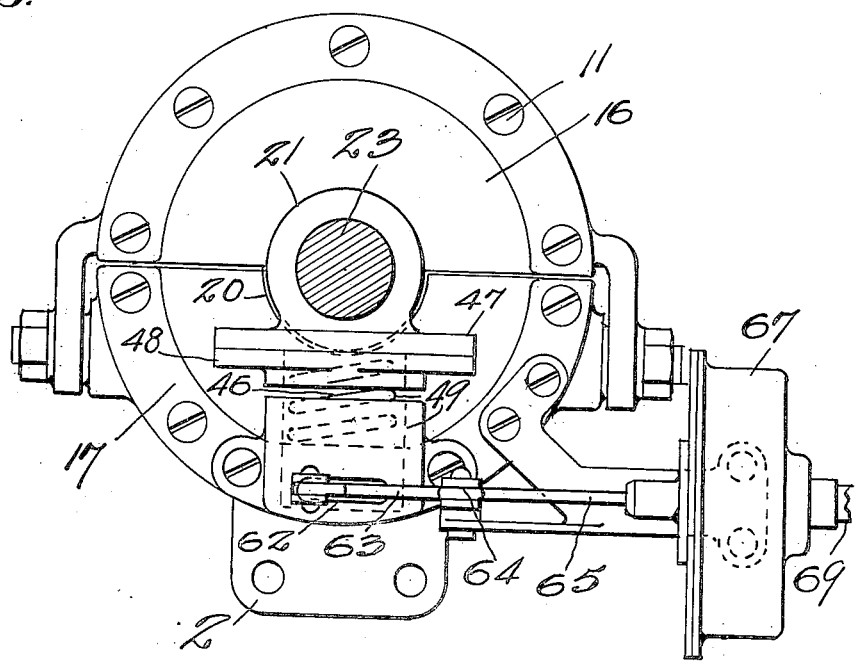
Figure 3 is an enlarged end view of the starter-motor with its shaft in section, as seen from the right in Figure 1, but with the gears meshed.
Figure 4:
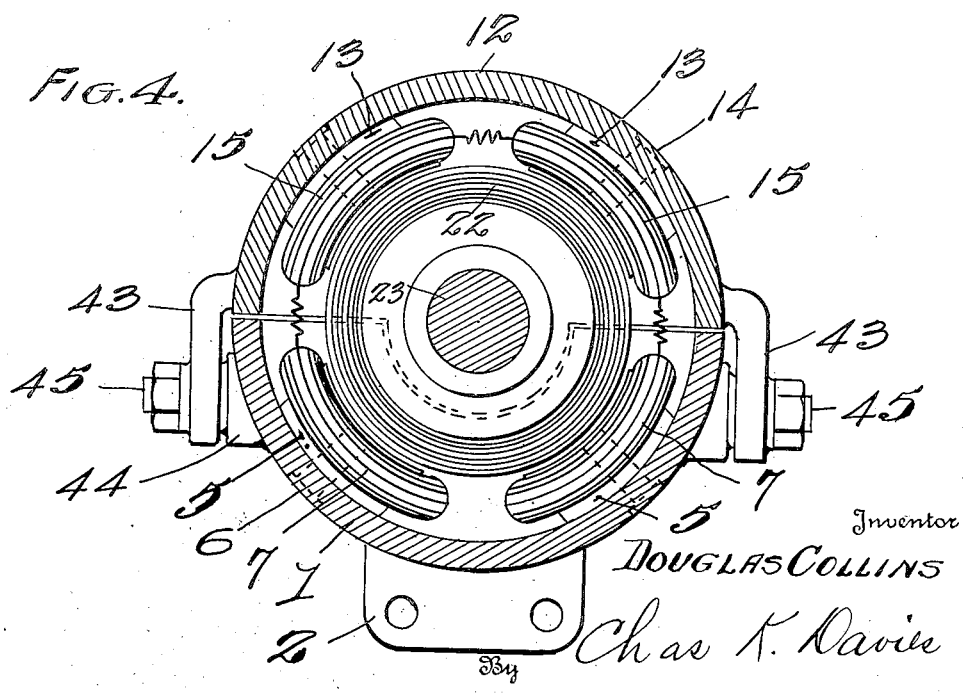
Figure 4 is a transverse sectional view through the motor showing the armature and fields in full, and with the motor in operating position.

In Figure 1 I have indicated a portion of an internal combustion engine with which the starting motor is associated, and it will be understood that the starter may be mounted in any suitable and appropriate manner for co-action with the gear-ring G of the flywheel of the engine. The electric starting motor is longitudinally split or divided and fashioned with semi-cylindrical sections, of which the section 1 may be fixed on any suitable support, by the attaching flanges 2, 2, bolts 3, 3, and the bracket 4.

Within the fixed section 1 of the starter casing are secured two field cores 5, 5, by means of screws 6, and the wires or coils 7, 7, of the fields are wound upon the cores in usual and appropriate manner. The usual slots 8 provide ready access to the interior of the motor casing, and the slotted end of the casing or rear end of the starter is closed by two semi-circular end plates 9 and 10 forming the rear head of the casing, bolts 11 being employed for securing the plates to the casing.

The complementary section 12 of the casing is movable with relation to the fixed section 1, and this movable section has mounted therein two field cores 13, 13, secured by screws 14 from the exterior of the casing-section. The coils or windings of the fields for the movable section are designated 15, 15, and these fields are arranged in the casing complementary to the fixed fields at diametrically opposite sides of the longitudinal axis of the starting motor.

The movable section 12 of the casing is also fashioned with a semi-circular plate 16 and the fixed section has a complementary plate 17, secured to the casing by screws and forming the front head of the motor casing.

As shown in Figures 1 and 2, the head-plate 9 is formed with an integral bearing boss 18, and the head-plate 10 is fashioned with a semi-circular recess 19 to accommodate this boss; while in Figures 1 and 3 the plate 17 has a recess 20 to accommodate a bearing boss 21 on the head plate 16. These bearing bosses 18 and 21 are rigid with the movable section of the casing, and the armature 22 housed in the split casing has its shaft 23 journaled in these alined bosses, with one end of the shaft projecting, as an extension, from the front of the casing or motor.

On the extended end of the armature shaft a worm-gear 24 is keyed to revolve with the shaft, and is slidable thereon, means being provided for retaining the worm-gear in operative relation to the gearing G for starting the engine, and to permit sliding movement of the worm-gear under impulse of the gear-ring G, as will be described.

The electrical starting motor is equipped with a suitable commutator 25 on the armature shaft, and located in the space between the armature and the rear end of the casing, and four brushes are illustrated in contact with the commutator. The brush 26 is connected by its wire 27 to the movable casing-section 12 at 28; the diametrically opposed brush 29 is connected by wire 30 to the fixed casing section 1 at 31; the brush 32 is connected by its wire 33 to one of the fixed field coils 7; and the brush 34 is connected by wire 35 to the other fixed field coil 7.

The brushes are mounted in suitable holders 36 which are supported in suitable manner on the head plates 9 and 10, and springs 37 connected at one end to a brush and anchored at the other end to a pin, as 38, hold the brushes in contact at all times with the commutator. These pins are fixed on the head plates, and the springs provide a resilient means for urging the brushes at all times in contact with the commutator.

Electric current for operating the motor is supplied to the contact button 39 through wire 40, to the movable portion of the motor, and a ground wire 41 is indicated in Figures 1 and 5 for grounding the motor circuit at 42 on the engine. It will be understood that any other suitable electric connections may be made for the motor circuit in supplying current to the starter.

The movable portion of the electric starter is mounted on the fixed portion of the starter through the use of a hinge or pivot, remote from the power transmitting worm-gear 24 and near the rear end of the starter. The movable section 12 is provided with a pair of widely spaced, exterior bearing lugs 43, and the fixed section of the casing is provided with a pair of exterior bosses 44. The lugs and bosses are hinged or pivoted on axially alined bolts 45 which provide bearings on which the movable section or portion of the motor may tilt, rock, or swing, when the motor is energized by the passage of electric current therethrough.

By means of this tilting, swinging, or rocking motion of the movable part of the motor, the worm-gear 24 is caused to be engaged with the gear-ring G, and the latter is then revolved by the former.

To release, or disengage, the worm-gear 24 from the gear-ring G, after the former has performed its functions, I provide a suitable spring 46, which is compressed and placed under tension when the starter is operating, and which, by its expansion disengages the worm-gear from the gear-ring after the engine is started.

The spring is preferably mounted on the stationary or fixed portion of the casing, and the movable section of the casing is provided with means to receive the power applied by the compressed spring. A convenient arrangement for mounting the spring is indicated in Figures 3 and 6, where the bearing boss 21 is fashioned with a flange 47, to which a recessed guard-cap 48 is attached, and the spring 46, which is located in a flanged cup or housing 49, bears against this cap 48. The housing or cylindrical cup 49 is attached as by screws to the head-plate 17 of the fixed section of the motor casing, and the spring in the housing is interposed between the cap 48 and an upper cam disk 50 in the housing. A second cam disk 51 is also located in the bottom of the housing, beneath the disk 50, the second disk being rotatable, and the disk 50 being non-rotatable but movable to compress the spring and increase its tension. The non-rotatable disk may be held against rotation by suitable means, as for instance ribs 52 on the periphery of the disk engaged in longitudinally extending grooves 53 in the cylindrical wall of the housing, which ribs and grooves permit movement of the disk for compressing the spring. The lower, rotatable disk 51 has a central opening and it is journaled to revolve on a pin 54 rigid with the bottom of the housing. The adjoining faces of the two disks are provided with cams, and it will be apparent that when the disk 51 is turned on its pivot pin 54 to bring the high points of the opposed cams in contact, the non-rotatable disk will have been moved away from the rotary disk a distance equal to the height of the cams. By this means, or in other suitable manner, the spring 46 may be compressed to increase its tension beyond the tension required to disengage the worm-gear and gear ring when the starting circuit is open.

In Figure 1 particularly, it will be noted that there is a gap, indicated by the edge 55 of the movable section of the starter motor, and the edge 56 of the fixed portion of the motor, between the two casing sections, and in this position (i. e. the disengaged position of the starter) there is also a gap between the armature and the two fixed fields 7, 7.

At the rear end of the motor this gap is closed, with the abutting edges back of the pivot 45 in contact, and these abutting edges limit the pivotal movement of the movable section 12, its fields 13—15, and the armature and its shaft, when the tension of the spring 46 is employed to disengage the worm-gear from the gear ring.

Inasmuch as the worm-gear when swinging into and out of engagement with relation to the gear-ring must move through an arc of a circle that is greater in length than the depth of the teeth of the gears, the width of the gap must be such as to permit this required movement. When the gears are engaged the two edges 55 and 56 are in close contact, and the entire casing is a substantially closed housing for the fields and armature, with the parts of the motor in their proper positions for performing their usual functions.

The worm-gear 24, as before stated is keyed to revolve with the armature shaft, and it is also slidable thereon, the inward or rear movement of the sliding action being limited by means of a collar 57 fixed on the shaft.

The worm-gear may slide forward or outwardly on the shaft against the tension of spring 58, which is coiled about the shaft and interposed between a slidable, cupped bearing head 59 adjoining the worm gear, and a fixed cupped bearing head 60 secured at the outer or front end of the shaft.

Thus it will be, apparent that when the gear-ring, after being started by the motor in Figure 2 and upon the initial impulse from the engine, bears against the worm-gear, the latter is pushed forward against the tension of the spring 58, thus reducing the friction and the demeshing load on the teeth of both the worm gear and the gear-ring. By this simple arrangement of parts, the necessity for an overrunning clutch, automatic cut-out, or threaded shaft, as heretofore employed, is eliminated; the spring returns the worm-gear to operative position when the engine starts, and the gears cannot again be meshed or engaged while the engine is running.

The engagement and disengagement of the gears are thus accomplished in a smooth and silent manner, without danger of stripping either of the gears of its teeth, and with accuracy and reliability.

For the operation of the cam device to augment the tension of the spring 46 I employ an engine-operated actuating device, here illustrated as a suction device responsive to the vacuum condition existing in the engine cylinders when the engine is running, but it will be understood that the cam device and the actuating means for the cam device here shown are merely illustrative, and other means and mechanisms may be employed for this purpose, i. e. for increasing the tension of the spring 46, when the engine starts.

As best seen in Figures 6 and 7 the rotatable cam disk 51 is equipped with an arm 61 that projects outwardly through an arcuate slot 62 in the spring housing 49, and a bell-crank lever 63, which is pivoted on a suitable stationary support at 64 has its longer arm pivotally connected with the arm 61, and its shorter arm pivoted at the free end of a reciprocable stem 65, the parts being slotted in suitable manner to permit the required movement that is necessary for swinging the rotatable disk 51 as heretofore described. The stem has mounted thereon a diaphragm or piston 66 and the stem is slidably supported in suitable bearings of a housing 67 forming a suction chamber in which the diaphragm or piston 66 is located. Vent holes 68 are provided in the head of the housing at one side of the diaphragm 66, and a pipe 69 is connected to the housing at the other side of the diaphragm. The pipe 69 leads to the intake manifold of the internal combustion engine, or to some other part of the engine where suction is created, and by means of the suction at one side of the diaphragm and atmospheric pressure admitted through holes 68 at the other side of the diaphragm, the latter is moved against the tension of spring 70 interposed between the diaphragm and the wall of the housing as shown.

Thus, while the engine is running, this engine-operated actuating means actuates the cam 51 to compress spring 46 to provide augmented power or tension in the spring.

In starting the engine it will be understood that both a magnetic current for engaging the gears is required, and the usual energy is required to revolve the worm gear and gear ring. When the engine starts and the starting load is thereby removed from the motor, the free running electrical current thus released weakens the magnetic circuit, and therefore, the augmented tension of the spring is instrumental in promptly demeshing the gears.

When the engine is running the cams are held in position to reinforce the spring so that the starter cannot become accidentally engaged, for the reason that the tension of the spring exerts a power greater than the magnetic power of the divided motor.

When the engine stops running, and should the cams permit the spring to expand, the spring 46 remains under tension sufficient to hold the worm gear out of engagement with the worm ring or gear ring in the absence of the magnetic pull in the motor.

By the employment of the resiliently-backed, slidable, worm-gear for driving the gear-ring, a higher gear-ratio between these members may be employed than is usually possible in engine starters, and this difference in gear-ratio permits the use of a comparatively small, light, and inexpensive type of motor which economizes in the consumption of electrical energy, and permits a wider use of the energy from the battery for automobile accessories and other electrical appliances.

Having thus fully described my invention, what I claim as new and desire to secure by Letters Patent is:—

1. The combination with an internal combustion engine and its driven member, of a longitudinally divided electric motor comprising a fixed section, a movable section, means for separating said sections to inoperative position when the engine is idle, a motor driven member movable with the movable section for engagement with the first driven member, and engine-operated means for augmenting the separating means when the engine is running.

2. The combination with an internal combustion engine and its driven member, of a split electric starting-motor comprising a fixed section, a movable section and a driving member movable therewith, means for separating said sections to inoperative position when the motor is de-energized, and means for augmenting said separating means when the engine is running.

3. The combination with an internal combustion engine and its driven member, of a split electric starting-motor comprising a fixed section, a movable section and a driving member movable therewith, means for separating said sections to inoperative position when the motor is de-energized, and engine-operated means for augmenting said separating means when the engine is running.

4. The combination with an internal combustion engine and its driven member, of a split electric starting-motor comprising a fixed section, a movable section and a driving member movable therewith, means for separating said sections to inoperative position when the engine is de-energized, and means actuated by suction from the engine for augmenting said separating means.

5. The combination with an internal combustion engine and its driven member, of a split electric starting-motor comprising a fixed section, a movable section, and a driving member movable with the movable section, whereby the driving member is moved into engagement with the driven member when the motor is energized, and engine-operated means for disengaging said members when the engine is running.

6. The combination with an internal combustion engine and its driven member, of a split electric starting-motor comprising a fixed section, a movable section, and a driving member movable with the movable section, whereby the driving member is moved into engagement with the driven member when the motor is energized, and engine-operated means responsive to suction when the engine is running for disengaging said members.

7. The combination with an internal combustion engine and its driven gear, of a longitudinally split electric starting motor comprising a fixed section, a movable section, and a worm-gear movable with the movable section, means for separating said sections to inoperative position, and engine-operated means for augmenting said separating means when the engine is running.

8. The combination with a driven gear of a longitudinally split electric starting-motor comprising a fixed section; a movable section, its armature shaft, and a worm-gear on said shaft, whereby the worm-gear engages the gear ring when the motor is energized; said worm-gear having means whereby it may be displaced under initial impulse of the engine; and means for separating said worm-gear from the gear ring.

9. The combination with a driven gear, of a longitudinally split electric starting-motor comprising a fixed section, a movable section and its armature shaft and a slidable worm-gear keyed on the shaft, whereby the worm-gear engages the driven gear when the motor is energized, a spring on the shaft to permit displacement of the worm-gear under initial impulse of the running engine, and means for separating said worm-gear from the driven gear.

10. The combination with a driven gear, of a longitudinally split electric-motor comprising a fixed section, a movable section and a spring interposed between said sections, an armature shaft journaled in the movable section and a gear thereon, whereby the gears are engaged when the motor is energized, and engine operated means for augmenting the tension of said spring for disengaging said gears.

DOUGLAS COLLINS.